R. H. SMITH.
COTTON STALK AND VINE CUTTER AND HAY TURNER.
APPLICATION FILED MAY 29, 1918.
1,286,816.
Patented Dec. 3, 1918.
2 SHEETS—SHEET 2.
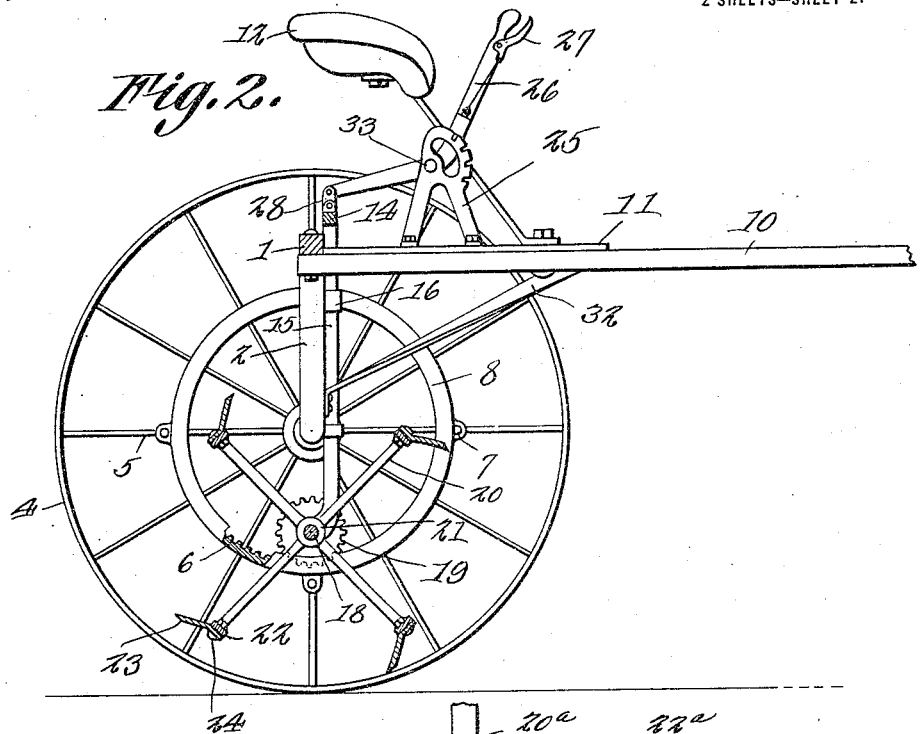
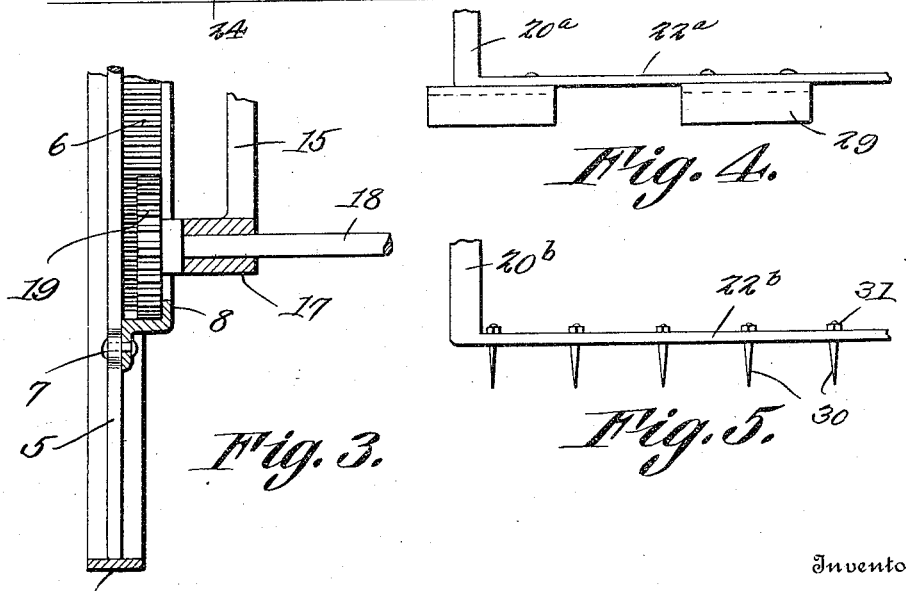
Inventor
R. H. Smith
By C. A. Snow & Co.
Attorneys
Witness

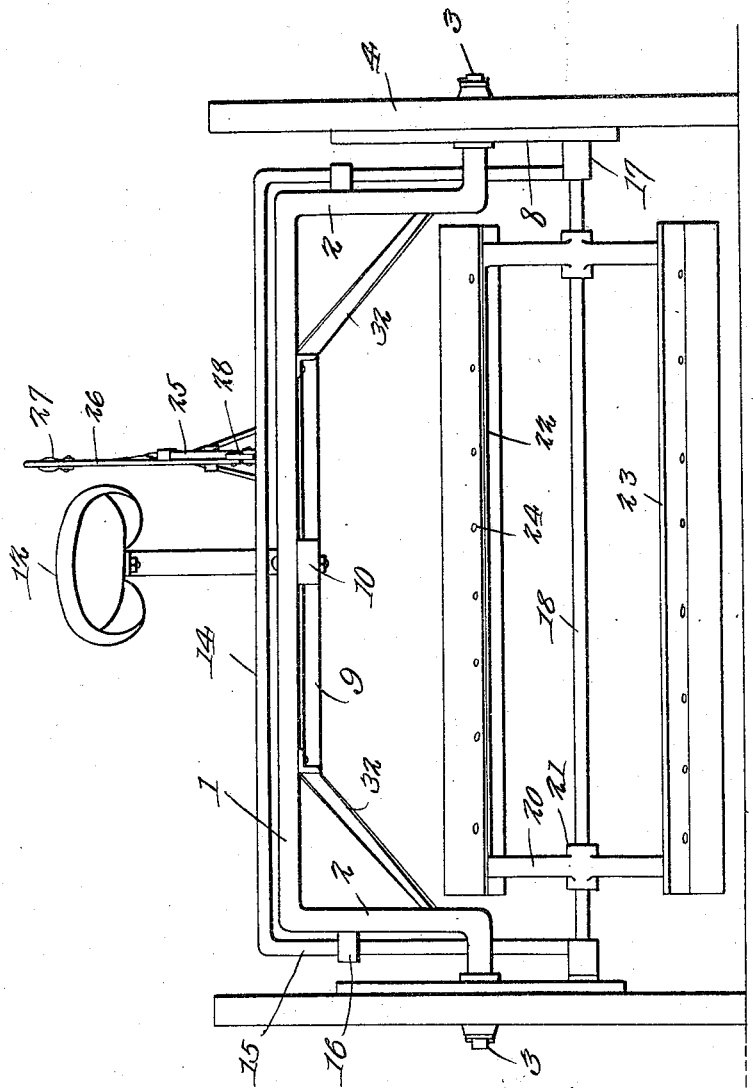

UNITED STATES PATENT OFFICE.

ROBERT H. SMITH, OF HENDERSONVILLE, NORTH CAROLINA, ASSIGNOR OF ONE-HALF TO A. C. TEBEAU AND J. F. JUSTICE, BOTH OF HENDERSONVILLE, NORTH CAROLINA.

COTTON-STALK AND VINE CUTTER AND HAY-TURNER.

1,286,816.  Specification of Letters Patent.  Patented Dec. 3, 1918.

Application filed May 29, 1918. Serial No. 237,287.

*To all whom it may concern:*

Be it known that I, ROBERT H. SMITH, a citizen of the United States, residing at Hendersonville, in the county of Henderson and State of North Carolina, have invented a new and useful Cotton-Stalk and Vine Cutter and Hay-Turner, of which the following is a specification.

The device forming the subject matter of this application is adapted to be used for cutting cotton stalks, vines and the like, and for turning or tedding hay or other crops.

The invention aims to provide novel means for operating the rotary member which cuts the stalk or turns the hay, to provide novel means for raising and lowering the rotary member, and, generally, to improve and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in rear elevation, a device constructed in accordance with the present invention; Fig. 2 is a vertical longitudinal section of the device shown in Fig. 1; Fig. 3 is a fragmental transverse section wherein parts appear in elevation, the view depicting the driving means whereby rotation is imparted to the rotary member; Fig. 4 is a fragmental plan showing a slight modification of the invention; and Fig. 5 is an elevation showing a further modification of the invention.

In carrying out the invention as disclosed in Figs. 1, 2 and 3, there is provided a vehicle including an arched axle 1 having depending parts 2 terminating in outstanding stubs 3 on which the ground wheels 4 are journaled. The ground wheels 4 include spokes 5 to which internal gears 6 are secured as shown at 7, the internal gears having vertical flanges 8.

Hounds 9 are attached to the top portion of the axle 1 and are connected to a tongue 10 which is also united with the axle, the parts above mentioned being sustained by means of braces 32. In general, however, the vehicle may be of any desired construction. A platform 11 is supported on the tongue 10 and the hounds 9 and carries a seat 12.

The numeral 14 marks a vertical U-shaped frame including depending ends 15 mounted to slide, vertically in guides 16 carried by the depending parts 2 of the arched axle 1. The lower ends of the parts 15 are provided with bearings 17 in which a horizontal shaft 18 is journaled for rotation. Pinions 19 are attached to the ends of the shaft 18 and mesh into the internal gears 6 on the ground wheels 4. Hubs 21 are attached to the shaft 18, and arms 20 radiate from the hubs, opposite arms being connected by a cross bar 22. Blades 23 are attached removably, by means of securing devices 24, to the cross bars 22, the blades projecting outwardly from the cross bars 22, as clearly disclosed in Fig. 1.

A keeper 25 is mounted on the platform 11. An angular lever 26 is fulcrumed at 33 on the keeper and carries a latch mechanism 27 adapted to coact with the keeper. A link 28 is pivoted to the rear end of the lever 26 and is pivoted to the intermediate portion of the U-shaped frame 14, the lever and attendant parts preferably being located slightly to one side of the seat 12, as clearly disclosed in Fig. 1.

In practical operation, when the ground wheels 4 are rotated, the internal gear 6 will rotate the pinion 19, the pinion 19 rotating the shaft 18 and the shaft actuating the rotary member comprising the hub 21, the arm 20, the cross bar 22, and the blades 23. It will be obvious that owing to the relative diameters of the pinions 19 and the gears 6, the rotary member will be operated at a high rate of speed, the blades 23 being effective to cut cotton stalks and vines of all kinds.

In order to secure the necessary vertical adjustment of the rotary member, and in order to lift the rotary member so that it will not be turned when it is not desired to use the rotary member, the lever 26 may be swung on the keeper 25, the link 28 raising the frame 14, the ends 15 of the frame sliding vertically in the guides 16, the shaft 18 being elevated, along with the rotary member, and the pinions 19 being lifted out of engagement with the internal gears 6, whereupon the vehicle may be moved about, without operating the rotary member. When the pinions 19 are raised and lowered as above described, the flanges 8 of the internal gears 6 act as guides for the pinions for a limited distance.

In the modification shown in Fig. 4, parts hereinbefore alluded to have been designated by numerals previously used, with the suffix "a". In this form of the invention, the blades 29 are spaced from each other, whereas in Figs. 1 and 2, a continuous blade 23 is employed.

Referring to the modification depicted in Fig. 5, parts hereinbefore alluded to have been designated by numerals previously used, with the suffix "b". In this form of the invention, teeth 30 are attached removably, by means of nuts 31 to the cross bars 22$^b$, the device shown in Fig. 5 being adapted to be used as a hay tedder, it being clear, comparing Fig. 2 with Fig. 5, that the teeth 30 may be substituted for the blades 23, when occasion requires.

Having thus described the invention, what is claimed is:—

In a device of the class described, an arched axle having vertical depending parts; ground wheels journaled on said parts of the axle, one ground wheel having an internal gear; a U-shaped frame including depending ends; means for mounting the ends of the frame on said parts of the axle for vertical sliding movement in a straight line; a shaft journaled in the depending ends of the frame; a rotary member carried by the shaft; a pinion mounted on the shaft and meshing into the internal gear; and means supported on the axle and connected with the frame for raising and lowering the frame and the pinion vertically, in a straight line, thereby to move the pinion into and out of engagement with the internal gear.

In testimony that I claim the foregoing as my own I have hereto affixed my signature in the presence of two witnesses.

ROBERT H. SMITH.

Witnesses:
R. C. CLARKE,
J. MACK RHODES.

Copies of this patent may be obtained for five cents each, by addressing the "Commissioner of Patents, Washington, D. C."